United States Patent [19]

Himes et al.

[11] Patent Number: 4,828,726

[45] Date of Patent: May 9, 1989

[54] STABILIZING CLAYEY FORMATIONS

[75] Inventors: Ronald E. Himes, Rush Springs; Edward F. Vinson, Duncan, both of Okla.

[73] Assignee: Halliburton Company, Duncan, Okla.

[21] Appl. No.: 95,990

[22] Filed: Sep. 11, 1987

[51] Int. Cl.$^4$ .................. E21B 43/12; E21B 43/25; E21B 43/27

[52] U.S. Cl. ................. 252/8.553; 166/305.1; 252/8.51; 252/8.551; 252/8.554; 405/264

[58] Field of Search ............... 252/8.551, 8.554, 8.553, 252/8.51, 8.513; 405/264; 166/305.1, 307

[56] References Cited

U.S. PATENT DOCUMENTS

| | | |
|---|---|---|
| 2,761,843 | 9/1956 | Brown . |
| 3,320,317 | 5/1967 | Rogers et al. ................. 210/736 X |
| 3,349,032 | 10/1967 | Krieg . |
| 3,500,925 | 3/1970 | Beiswanger et al. . |
| 3,591,520 | 7/1971 | McDonald ........................ 252/329 |
| 4,158,521 | 6/1979 | Anderson et al. . |
| 4,366,071 | 12/1982 | McLaughlin et al. . |
| 4,366,072 | 12/1982 | McLaughlin et al. . |
| 4,366,073 | 12/1982 | McLaughlin et al. . |
| 4,366,074 | 12/1982 | McLaughlin et al. . |
| 4,374,739 | 2/1983 | McLaughlin et al. . |
| 4,462,718 | 7/1984 | McLaughlin et al. . |
| 4,505,833 | 3/1985 | Lipowski et al. . |

*Primary Examiner*—Herbert C. Guynn
*Attorney, Agent, or Firm*—Robert A. Kent

[57] ABSTRACT

A process for treating clayey geological formations to prevent, inhibit or reduce swelling or migrating clay particles in a formation by treating the formation with an effective amount of a quaternized oligomer which comprises a methyl quaternary amine containing an average of from about 3 to about 6 moles of epihalohydrin. The treatment is effected by introducing the oligomer into the formation in an aqueous fluid which can comprise brine, salt solutions, acid solutions, gelled fluids and the like.

11 Claims, 8 Drawing Sheets

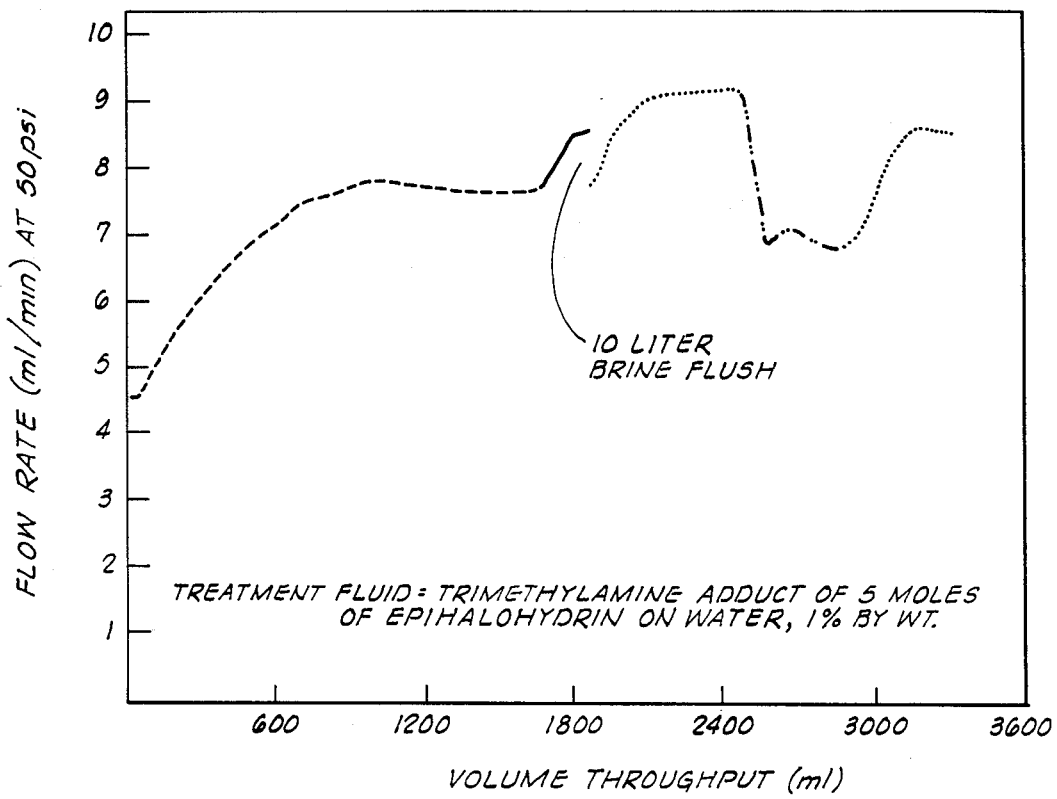
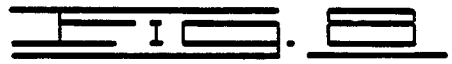
FIG. 8

4,828,726

STABILIZING CLAYEY FORMATIONS

BACKGROUND OF THE INVENTION

1. Field of the Invention

This invention related to a method of stabilizing clayey geological formations by treatment with a quaternized amine oligomer.

2. Description of the Prior Art

When geological formations containing water swelling clays come in contact with water, particularly fresh water, clays in the formations may swell, disperse with attendant loss of permeability and/or mechanical strength, or otherwise interfere with recovery of petroleum or other minerals from the formations. Clayey formations are often impermeable or have low permeability or lose part or all of their permeability on contact of the clays with water or water base systems such as injection fluids, drilling muds, stimulation fluids and gels.

Clays in formations can reduce permeability by swelling or migrating to form bridges or blockages in formation pores or screens used in well completions. Swelling and migration occur when aqueous fluids used in oil recovery come in contact with the clays.

Clays can also cause trouble in areas other than permeability reduction. When they are a component in shales, sandstones, or other formations, contact with a foreign water or at times with any water can cause the formation to lose strength or even disintegrate. This is a problem in building foundations, road beds, drilling wells and any situation where the formation strength is important.

There have been numerous attempts to control the ill effects of water on clay and/or other fines. These have been principally in the oil industry. One idea is to convert the clay from the swelling sodium form (or the more rare swelling lithium form) to another cation form which is less sensitive.

Example cations that form relatively non-swelling clays are potassium, calcium, ammonium and hydrogen ions. When a solution of these cations, mixed or individually, flows past a clay mineral, they readily replace the sodium ion and the clay is transformed to a relatively non-swelling form. The use of acid, potassium, calcium, or ammonium ions to exchange for sodium ion has been successful in preventing damage to formations susceptible to plugging or disintegrating due to clays in their compositions.

However, the exchanging of other ions for sodium on clay is only a temporary remedy. When a well is produced, the presence of sodium ion in the formation water will enable sodium ion to counter replace hydrogen, potassium, ammonium or calcium ion quickly. As a result, the clay is returned to the swelling or dispersible form, ready to cause damage should a foreign water be introduced.

The prior art and conventional features useful with this invention are described in references cited and/or discussed herein. Each reference cited or discussed herein is incorporated herein by reference to any extent deemed necessary for any purpose.

U.S. Pat. No. 2,761,843—Brown, describes a process for preventing or reducing permeability loss in clay containing formations by treating the clay body with substituted ammonium ions derived from certain basic nitrogen compounds.

U.S. Pat. No. 3,349,032—Krieg, describes a process for preventing, inhibiting or reducing "clay blocking" or plugging of oil producing clayey formations during oil recovery by adding a polyquaternary amine.

U.S. Pat. No. 3,500,925—Beiswanger et al, describes a process for improving flow rate of injection water through oil producing formations during oil recovery by adding a water soluble polymer, of a N-vinyl lactam and a water soluble salt.

U.S. Pat. No. 4,158,521—Anderson et al, describes treating with a solution of a reaction product of dimethylamine and epichlorohydrin to stabilize clay containing formations in oil and gas producing boreholes after these formations are penetrated.

U.S. Pat. Nos. 4,336,071, 4,366,072, 4,366,073, 4,366,074, 4,462,718 and 4,374,739—McLaughlin et al, describes methods of preventing or reducing swelling, migrating or dispersing of clay in an oil producing formation by treating the clay with an organic polycationic polymer dissolved in a carrier to stabilize the clay against dispersion or expansion by water.

U.S. Pat. No. 4,505,833—Lipowski et al, describes a process for treating clayey formations using a quaternized oligomer which is the reaction product of a polyamine having a primary amino group and a tertiary amino group with a difunctional reactant to form a precondensate monomer which then is chain extended and quaternized by reaction with a dihalogenated hydrocarbon ether.

SUMMARY OF THE INVENTION

A process for treating a clayey geological formation to prevent, inhibit or reduce swelling or migrating of clay particles in the formation by treating the formation with an effective amount of a quaternized oligomer which comprises a methyl quaternary amine containing an average of from about 3 to about 6 moles of trimethylamine. The cationic oligomer has a molecular weight of from about 300 to about 800. The oligomer can be formed by chain extension of a compound having the general formula

wherein $R_1$ can be interchangeably hydrogen, alkyl and substituted alkyl wherein the substituent may be one or more of hydroxy and amino groups wherein the amino group may be a primary, secondary, tertiary or quaternary amine. The chain extender comprises an epihalohydrin.

BRIEF DESCRIPTION OF THE DRAWINGS

FIG. 8 is a plot of recorded data comparing flow rate versus volume throughput for a sample utilized in treatment fluid wash-off tests.

DETAILED DESCRIPTION OF THE PREFERRED EMBODIMENT

Figure 1:
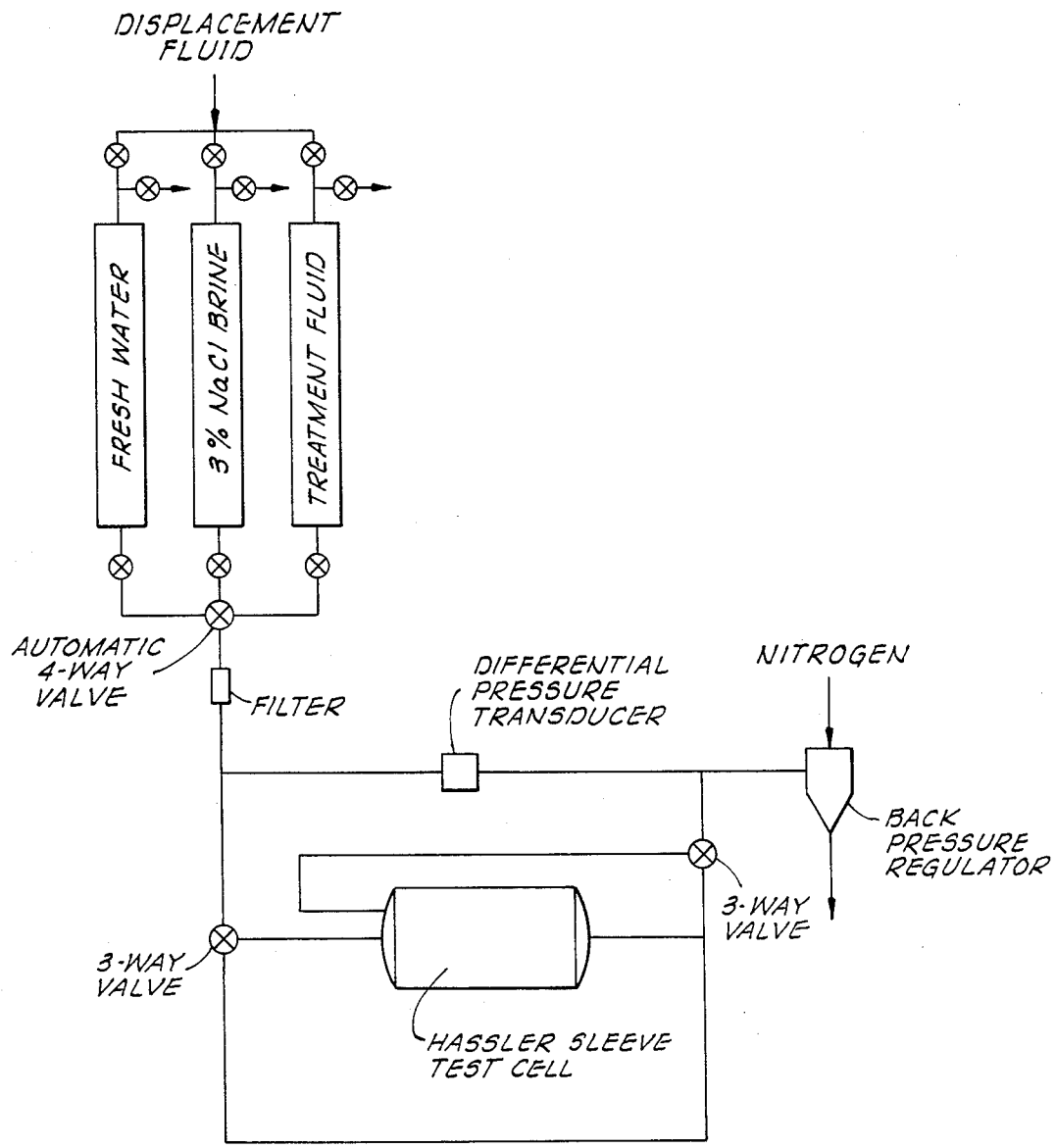
FIG. 1 is a diagrammatic schematic illustration of the flow cell test apparatus.
Figure 2:
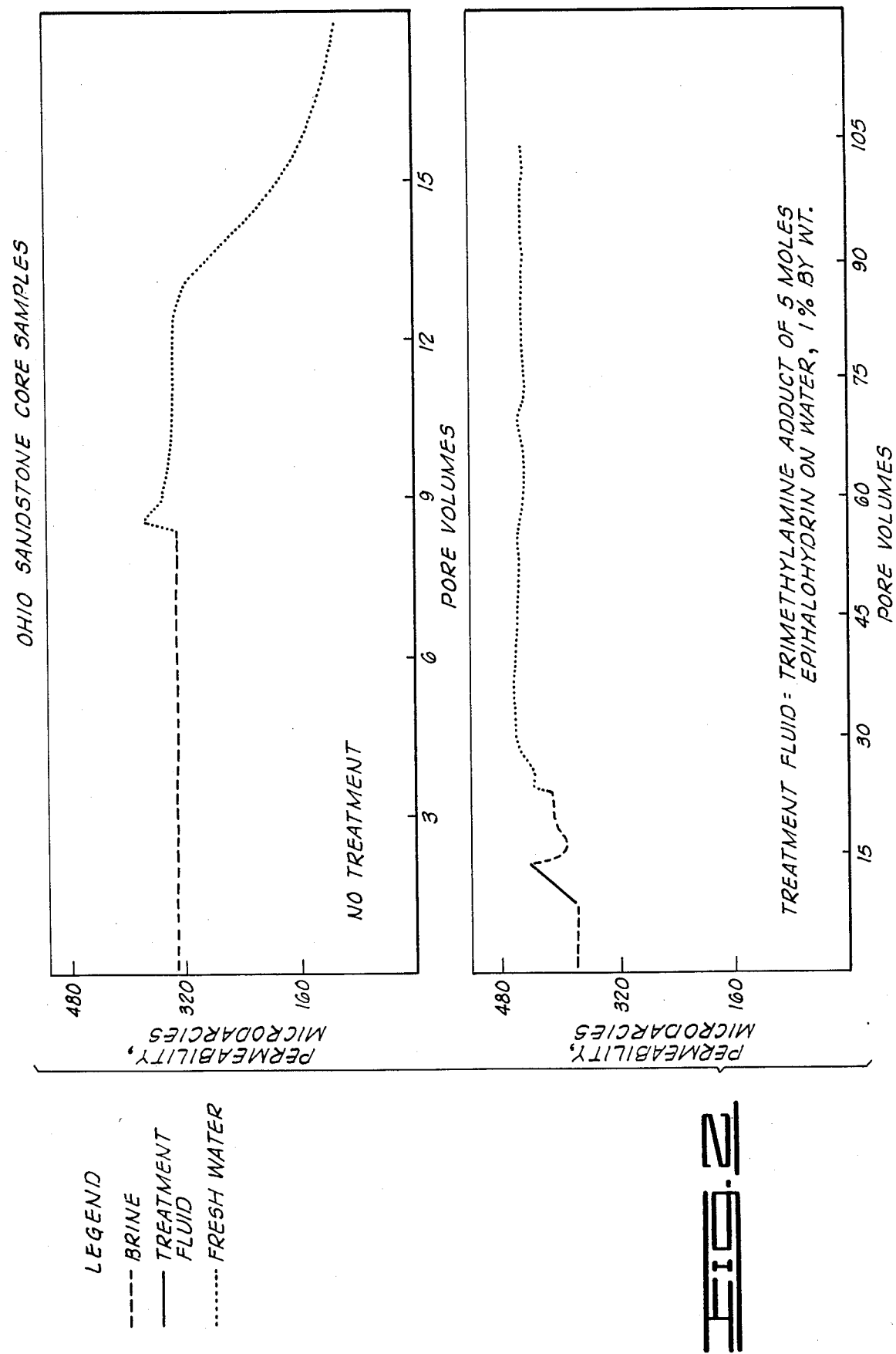
FIGS. 2-7 are plots of recorded data from flow tests comparing permeability versus pore volumes for various core samples of clayey formations.
Figure 3:
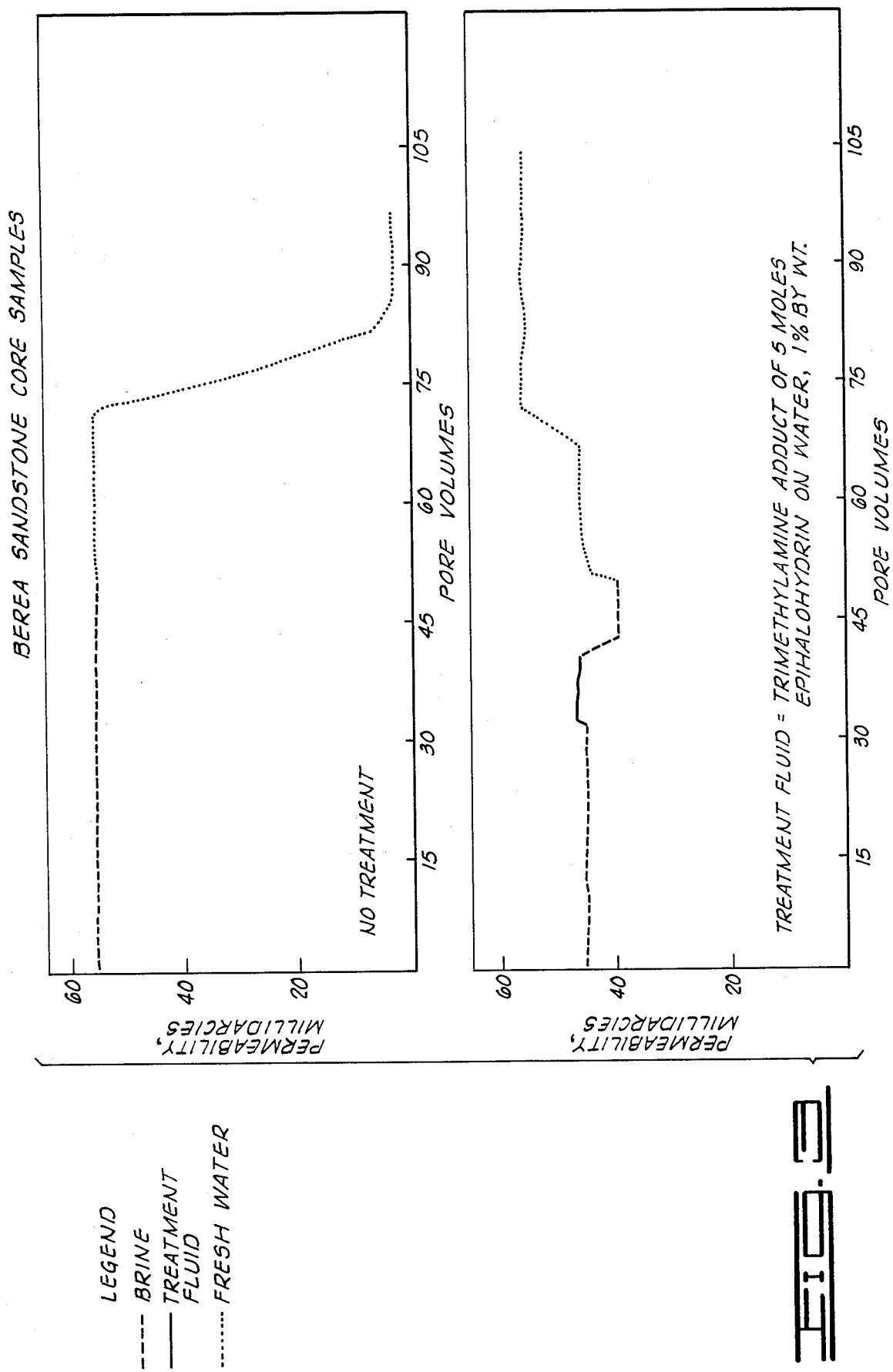
Figure 4:
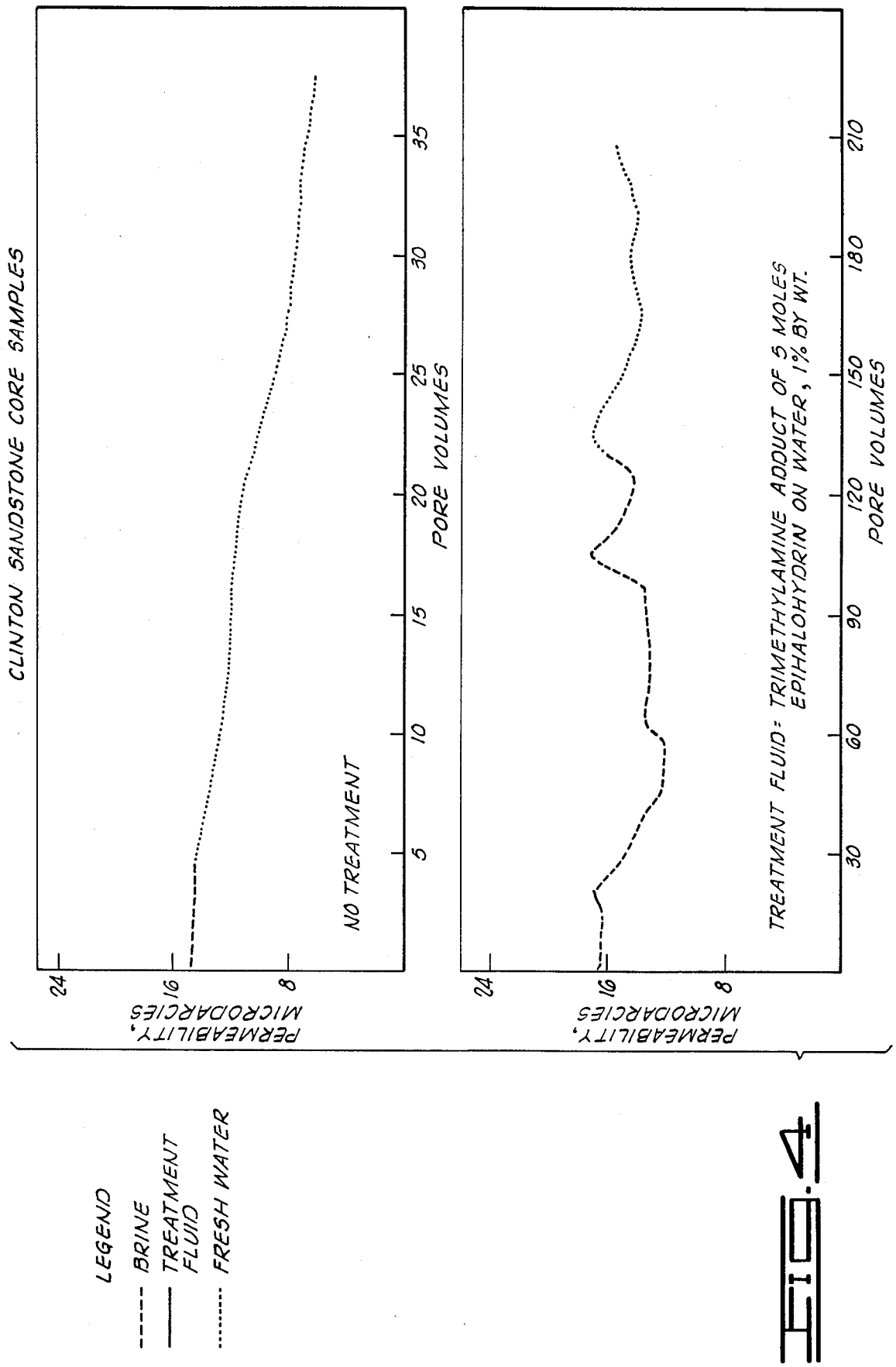
Figure 5:
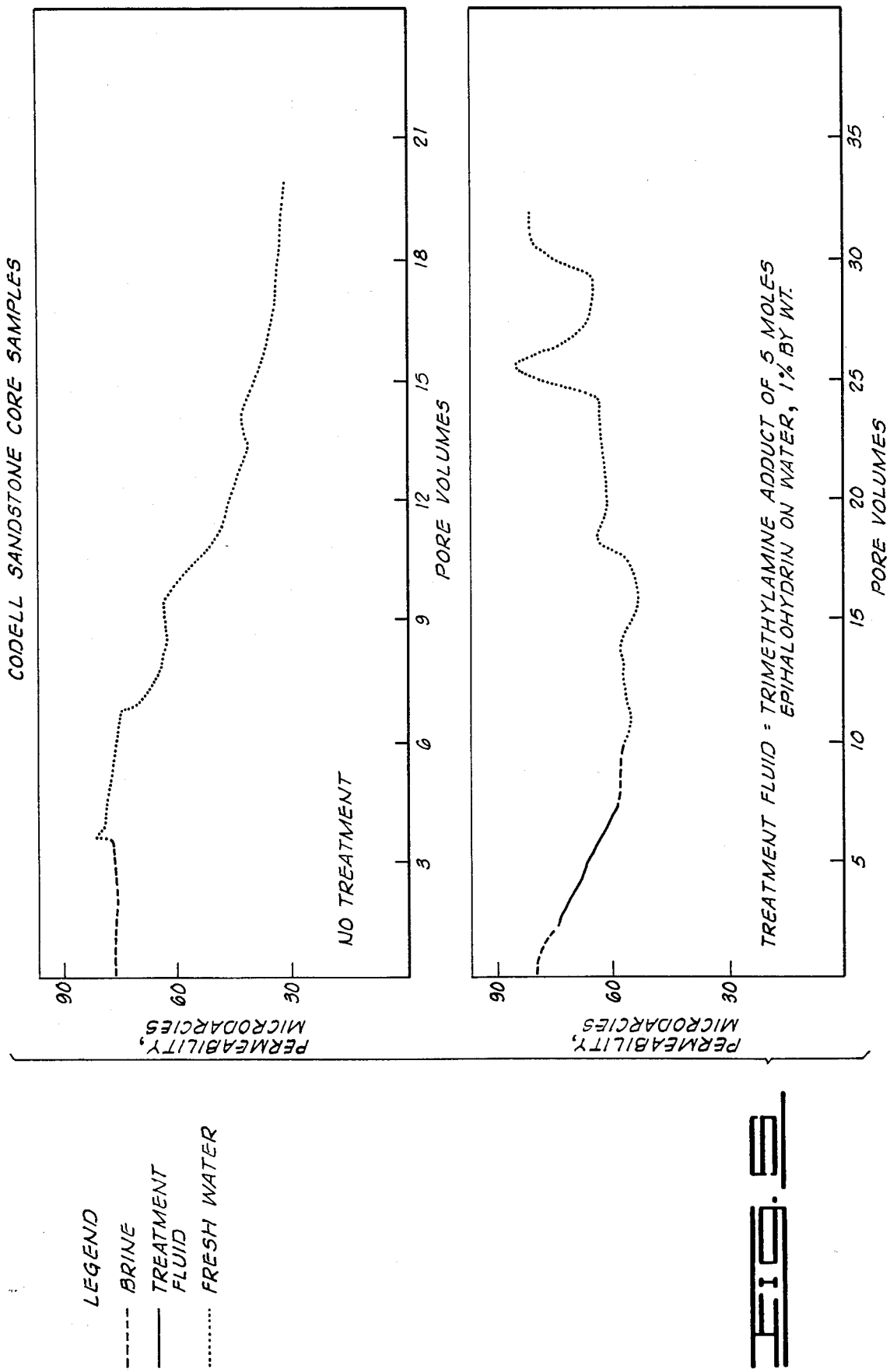
Figure 6:
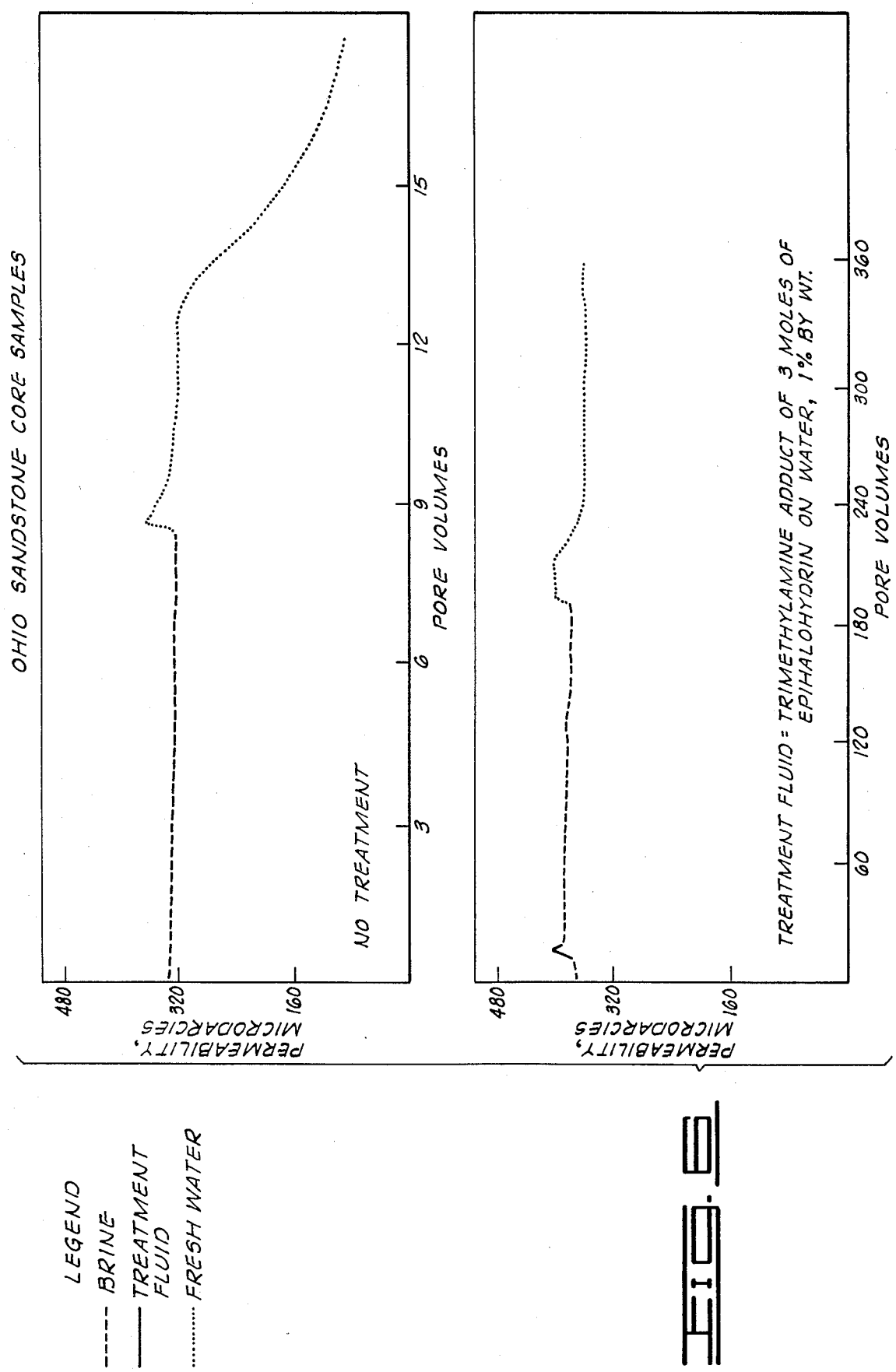

This invention uses cationic oligomers to prevent or reduce the adverse effects of swelling clays and/or migrating fines in clayey geological formations. An aqueous solution of the oligomer is flowed past the clay to be treated without dispersing the formation particles until the oligomer replaces the clay cation, normally sodium ion, and transforms the clay to a more stable form that is much less likely to swell or migrate. Oligomers used in this invention have several advantages. They can be applied to all types of formations regardless of carbonate content. They are acid resistant. The formation can be treated with acid later, without destroying their clay treating ability. They are placeable in water solutions including a wide range of brines and acids. The treatment with oligomers is essentially permanent. Oligomers are very resistant to removal by brines, oils or acids. Oil wetting of formations can be avoided. Formations can be made pH tolerant. A very short cure time is required. Very low permeability formations can be treated. The oligomers have been found to be effective on formations having a permeability below about 50 millidarcy and have been found to be particularly effective on formations having a permeability of about 30 millidarcy or less. Presently available commercial clay stabilizers have been found to result in excessive formation damage at such low permeability levels, in contrast to the substantially nondamaging stabilization effected by the present invention. They can have high permeability retention after clays and fines are treated. Formations having temperatures from about 70° F. to greater than about 500° F. can be treated with the oligomers.

Clayey geological formations are stabilized by treating the formations with a solution of a carrier fluid containing an effective amount of a quaternized oligomer which is formed by chain extension of a compound having the general formula $R_1OH$ wherein $R_1$ can be interchangeably hydrogen, alkyl and substituted alkyl. The substituent of the alkyl group can be one or more hydroxy or amino groups wherein the amino group may be a primary, tertiary or quaternary amine. The chain extender is an epihalohydrin. The reaction which occurs is generally of the schematic form as set forth hereinafter; when $R_1$ is hydrogen; and the extender is epichlorohydrin.

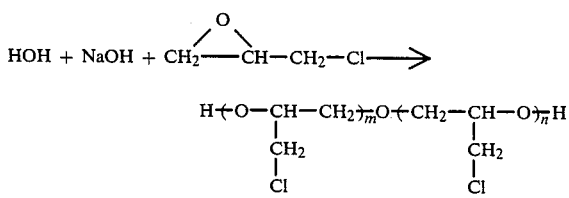

which is reacted with trimethylamine to form

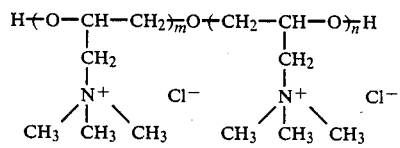

The sum of m+n can be an integer or fraction thereof having an average value in the range of from about 3 to about 6.

The radical $R_1$ as indicated herein can be, for example, a methyl group, hydroxyethyl group, dihydroxypropyl group, hydroxypropyl group and the like.

The anion of the salt form of the oligomer can comprise any suitable anion such as for example $Cl^-$, $F^-$, $Br^-$, $I^-$, $NO_3^-$, $\frac{1}{2}SO_4^=$ and the like which yields a soluble compound and which does not adversely react during treatment with the constituents of the subterranean formation. The specific reaction conditions necessary to yield the foregoing compounds are well known to individuals skilled in the art and various methods are taught, for example, in U.S. Pat. Nos. 3,591,520; 3,403,144; 3,746,678 and 3,864,288; Mark et al *Encyclopedia of Polymer Science and Engineering*, 2nd Ed. Vol 6, p 310 (1986); Furukawa, J. and Saegusa, T. *Polymerization of Aldehydes and Oxides*, p 338 (1963). Compounds of the type described are available from for example, the Nalco Chemical Company, Sugarland, Tex.

Treatment of clayey geological formations with the oligomer can be accomplished by any suitable method which provides effective and intimate contact between the solution and the clay. When treating a formation adjacent to the well bore, the oligomer solution can be spotted adjacent to the formation being treated and then allowed to penetrate into the formation using pressure if necessary. When gun or jet perforating the casing, the solution can be spotted in the interval of the borehole being perforated before the gun or jet is discharged. In oil recovery, the solution can be used in front of the flood to stabilize the clayey formation as the flood precedes through the formation to prevent any decline in injection rate caused by swelling or dispersing of the clay near the wellbore. In the producing formation in the immediate vicinity of the borehole, production can be stimulated by injecting sufficient treating solution to penetrate from about 3 to about 20 feet into the formation and then resuming oil production. In injection wells, including disposal wells, the solution can be introduced in front of the injection fluid or concurrently therewith to stabilize the clayey formation.

Wells being drilled with air or gas are often troubled by swelling and heaving of formations traversed by the well bore. When these formations contain clay minerals, aqueous fluids such as mist or foam will cause sloughing of the formation and sticking of the drill string and/or bit in the hole. Some of these formations are known as "gumbo shale". Treatment and/or impregnation of these formations with oligomer solutions can alleviate the danger of swelling or heaving formations. This treatment can also be used in drilling or completion operations where two-phase fluids, such as emulsions, foams, fogs, smoke or gaseous dispersions, mists or a slurry, are used.

Acidizing is a common technique in improving well production. Acid is pumped into the formation to enlarge the pores and increase permeability. Hydrochloric acid is commonly used in carbonate formations such as limestone and dolomite and hydrofluoric acid solutions in sandstones. In some formations, acidizing loosens fines so that they migrate and cause plugging. A characteristic of these formations is that acidizing improves production, but a decline in production rate soon sets in as fines migrate and bridge within the formation thereby reducing the permeability. Use of oligomer solutions before, during and/or after acidizing minimizes fines production.

Hydraulic fracturing is a common technique in improving oil well production. The wellbore is pressured until the formation bursts and the resulting fracture exposes large areas of producing formation face. The cracks are normally prevented from healing and closing by pumping sand or other proppant material into the fracture. However, fracturing fluid that bleeds into the fracture face often interacts with clays and damages permeability. This damage is particularly critical when the permeability is low, i.e., about 10 millidarcies to 0.1 millidarcy. The oligomer solution when used in conjunction with fracturing operations will minimize any clay swelling or damage.

A preferred method for treating a clay-containing formation is to stabilize it by contact with an oligomer solution using the following procedure. The clayey formation is contacted with a damaging aqueous solution comprising an aqueous fluid and a formation stabilizing effective amount of the quaternized oligomer. Preferably, the oligomer is present in the fluid in an amount of from about 0.01 to about 20 percent by weight of the aqueous fluid. More preferably the oligomer is present in an amount of from about 0.05 to about 10 percent and most preferably from about 0.1 to 5 percent by weight. The aqueous fluid can comprise various salt solutions such as, for example, solutions of sodium chloride, potassium salts such as potassium chloride, potassium hydroxide, potassium acetate, ammonium chloride, calcium chloride, calcium bromide, zinc bromide, zinc chloride and the like, aqueous acid solutions such as, for example, hydrochloric acid, citric acid, acetic acid, formic acid, hydrofluoric acid and mixtures of the same, fresh water and alcohol-water mixtures such as methanol and water as well as gelled fluids containing various polysaccharides and synthetic polymers.

Surprisingly, it has been found that the oligomers of the present inventions will displace guars and guar derivatives which have been absorbed on the particulate surfaces of the clay-containing formation. Such displacement often can result in an enhancement of formation permeability after the treatment by removal of the guar material introduced during prior treatments from contact with the clay particles. By displacement of the guar molecules from the clay particles, more complete treatment of the clay particles can be achieved thereby resulting in improved stabilization.

Among the clays which may be present originally in geological formations, or may have been introduced therein, for example in the drilling fluid or in other treatment fluids, that can be effectively treated with oligomers are clay materials of the smectite (montmorillonite) group such as montmorillonite, saponite, nontronite, hectorite, beidellite, and sauconite; the kaolin group such as kaolinite, nacrite, dickite, endellite and halloysite; the illite (hydrous-mica) group such as hydrobiotite, glauconite, and illite; the chlorite group such as chlorite, greenalite and chamosite; clay minerals not belonging to the above groups such as vermiculite, palygorskite (attapulgite) and sepiolite; and mixed-layer (both regular and irregular) varieties of the above minerals. The clay content of the formations can be a single species of a clay mineral or several species, including the mixed-layer types of clay. Of the clay minerals commonly encountered in the drilling of wells in geological formations which can cause the difficulties described above and which can be treated effectively with oligomers are clay minerals such as the montmorillonite, illite (hydrous-mica), chlorite and/or kaolin groups. It is to be understood that clayey formations treated with oligomers need not be entirely of clay but may contain other mineral components. Formations which are largely clay can, upon contact with water, or water containing fluids, swell and these swelled clays can develop pressures of several thousand pounds per square inch.

For a fuller understanding of the nature and advantages of this invention, reference may be made to the following examples. These examples are given merely to illustrate the invention and are not to be construed in a limiting sense. All quantities, proportions and percentages are by weight and all references to temperature are °F. unless otherwise indicated.

EXAMPLE I

Flow tests were conducted to determine the effectiveness of the compositions of the present invention in stabilizing clayey formations. A formation core sample was mounted in a Hassler sleeve test cell as set forth in FIG. 1. The differential pressure is measured across the Hassler sleeve by a differential pressure transducer. This transducer was connected to a computer which stored permeability and injected fluid volume data. The fluid source and transducer were connected to the Hassler sleeve test cell by three-way ball valves which allowed fluid to flow through the core sample in either direction while maintaining proper polarity of the transducer high and low pressure connections. The fluid output from the core sample was through a back pressure regulator loaded with 250 psi nitrogen pressure. The fluid is provided to the core sample from three stainless steel vessels connected to a computer controlled four-way high pressure ball valve. The steel vessels had a capacity of 600 ml. each. The fluid introduced into the core sample passed through an inline 2 micron filter element. The fluids in the vessels were displaced into the test cell by pumping a light mineral oil into the top of the vessels with a constant displacement high pressure pump. The vessels were all maintained at the test pressure and were selected by activation of the appropriate ball valves providing pulseless switching between the fluids. The fluids utilized in the tests comprised fresh deionized water, a 3% sodium chloride brine which had been filtered through a 0.45 micron filter and a treatment fluid comprising the compound set forth in the accompanying FIGS. 2-7 at the concentration shown in a 3% sodium chloride solution. A control test was run on samples of each core by flowing brine until permeability stabilized, followed by fresh water to induce shock. Treatment tests were run by flowing brine, until permeability stabilized, followed by the treatment fluid, followed by fresh water. All treatments utilized five pore volumes of fluid unless otherwise indicated. The results of the tests are set forth in the permeability versus pore volume plots of FIGS. 2-7. The composition of the sandstone core samples as determined by X-ray diffraction analysis was as follows:

| | SANDSTONES (Composition in Weight Percent) | | | |
|---|---|---|---|---|
| Mineral | Ohio | Berea | Clinton | Codell |
| Quartz | 50–60 | 60–70 | 80–100 | 75–90 |
| Feldspar | 2–5 | 0.5–2 | 2–5 | 5–10 |
| Calcite | — | 0.5–2 | — | — |
| Dolomite | 0.5–2 | 0.5–2 | 0.5–2 | — |
| Kaolinite | 5–10 | 5–10 | — | — |
| Illite | 2–5 | 2–5 | 2–5 | 2–5 |
| Mixed Layer | 5–10 | 5–10 | 2–5 | 5–10 |
| Chlorite | 5–10 | 0.5–2 | 0.5–2 | 0.5–2 |
| Siderite | 0.5–2 | 0.5–2 | — | — |
| Hematite | — | — | 0.5–2 | — |

Figure 7:
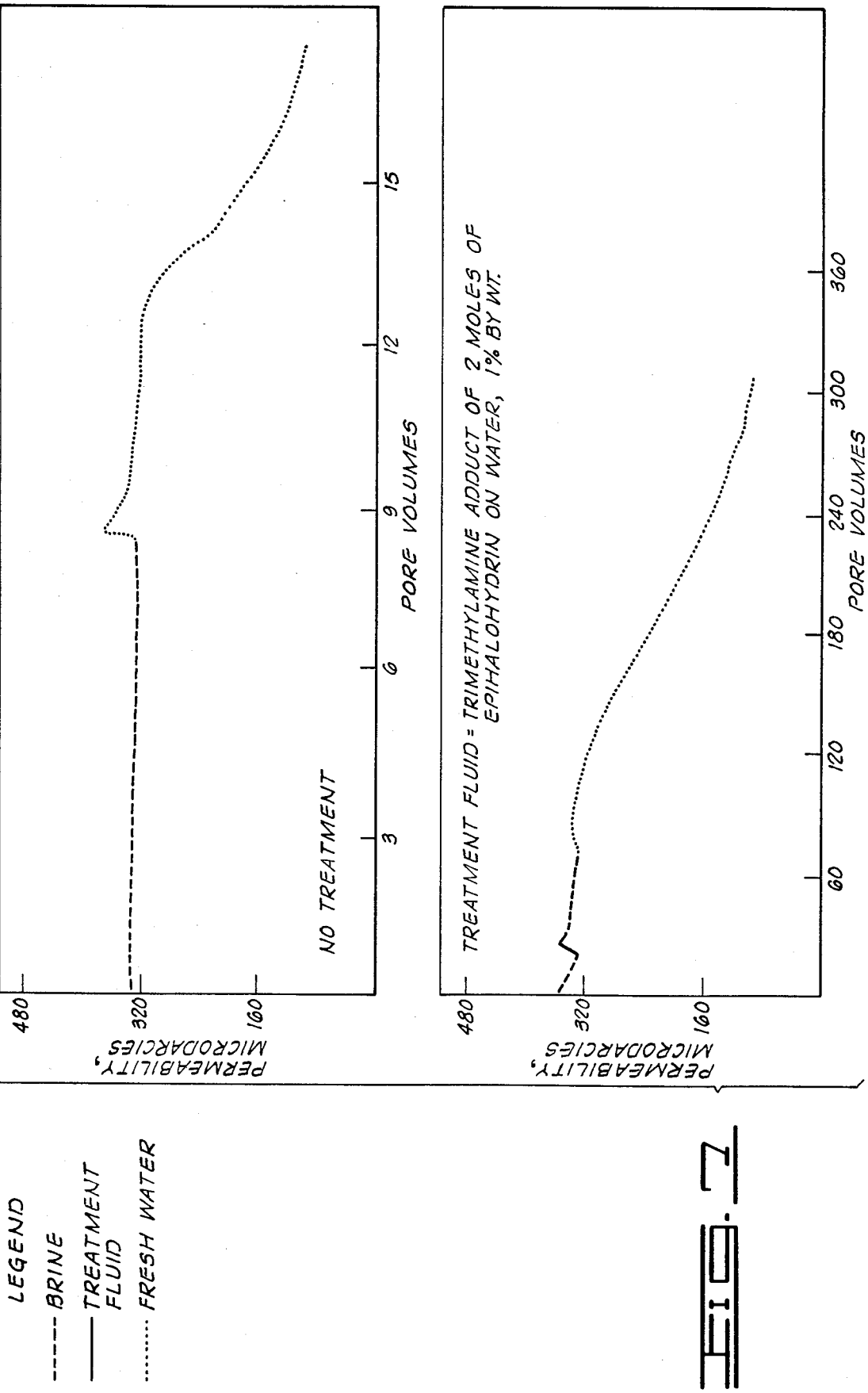

The tests results clearly demonstrate the utility of the composition of the present invention in stabilizing clayey formation samples as illustrated in FIGS. 2-6. FIG. 7 illustrates the inability of a composition outside the range of the present invention to stabilize the clay in the core sample.

EXAMPLE II

Tests were performed to determine the permanency of the treatment of a subterranean formation on simulated samples. The tests evaluated the resistance to wash-off of the treatment fluid from clay particles by acidizing fluids and by brine. Tests were performed by packing a Teflon® sleeved consolidation chamber with, from bottom to top, a 100 mesh U.S. Sieve series screen, 10 grams of Oklahoma No. 1 sand, 60 grams of a mixture of 85% Oklahoma No. 1 sand, 10% silica flour and 5% Wyoming bentonite clay, 10 grams of Oklahoma No. 1 sand and the remaining volume was filled with 20/40 mesh sand to the top of the chamber. The chamber had a cross-sectional area of 5.1 square centimeters and a volume of 58.4 milliliters. The sample is saturated with 3% sodium chloride brine for one hour at a temperature of 145° F. Brine then was flowed through the sample by application of a constant 50 psi fluid pressure until a flow rate was established. The sample then was treated with 200 ml. of a 1% by weight solution of the composition of the present invention. Following the treatment, 10 liters of brine were flowed through the sample to determine if any decrease in stabilization occurred during subsequent testing which would be an indication of the wash-off of the treatment. The sample then was contacted with fresh water to determine treatment effectiveness against wash-off. The sample then was contacted with 400 ml. of a solution of 15% hydrochloric acid to determine if acid wash-off occurred during a subsequent contact with fresh water. The results of the tests are set forth in FIG. 8.

The test results clearly indicate that the treatment remains effective for stabilizing clayey formations even after subsequent treatment with brine and acid fluids.

While that which is considered to be the preferred embodiment of the present invention has been described herein, it is to be understood that changes and modifications can be made by one skilled in the art in the method and composition described without departing from the spirit or scope of the invention as set forth in the appended claims.

What is claimed is:

1. A method of stabilizing a clayey geological formation comprising treating the formation with a solution of an aqueous fluid containing an effective amount of a quaternized oligomer having the general formula

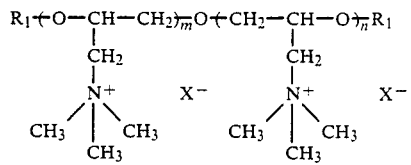

wherein $R_1$ is independently hydrogen, alkyl or substituted alkyl wherein the substituent is one or more of hydroxy and amino groups, $m+n$ is equal to an integer or fraction thereof having an average value in the range of from about 3 to about 6, the cationic oligomer has a molecular weight of from about 300 to about 800 and $X^-$ is a halide anion to prevent, inhibit or reduce swelling or migrating of clay particles in the formation.

2. The method of claim 1 wherein said oligomer is present in said aqueous fluid in an amount of from about 0.01 to about 20 percent by weight of said aqueous fluid.

3. The method of claim 1 wherein said oligomer is present in an amount of from about 0.05 to about 10 percent by weight of said aqueous fluid.

4. The method of claim 1 wherein said aqueous fluid comprises at least one member selected from the group of water, brine, salt solutions, hydrochloric acid, acetic acid, formic acid, hydrofluoric acid and citric acid.

5. The method of claim 1 wherein the formation is traversed by a well bore and the treating is effected during drilling to alleviate swelling of clay.

6. The method of claim 1 wherein said treating is effected during production from a producing formation or injection into a formation to inhibit swelling or dispersing of clay particles.

7. The method of claim 1 wherein said treatment is effected during fracturing or acidizing of said geological formation to prevent, inhibit or reduce swelling or migration of clay particles.

8. A method of stabilizing a clayey geological formation comprising treating the formation with an aqueous solution containing an effective amount of a quaternized oligomer having the general formula

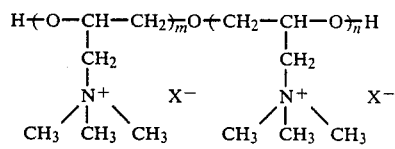

wherein $m+n$ equals an integer or fraction thereof having an average value in the range of from about 3 to about 6, the cationic oligomer has a molecular weight in the range of from about 300 to about 800 and $X^-$ is a halide.

9. The method of claim 8 wherein said methyl quaternary amine is present in said aqueous fluid in an amount of from about 0.05 to about 10 percent by weight of said aqueous fluid.

10. The method of claim 8 wherein said methyl quaternary amine is present in said aqueous fluid in an amount of from about 0.1 to about 5 percent by weight of said aqueous fluid.

11. The method of claim 8 wherein said treatment is effected during fracturing or acidizing of said geological formation to prevent, inhibit or reduce swelling or migration of clay particles.

* * * * *

UNITED STATES PATENT AND TRADEMARK OFFICE
CERTIFICATE OF CORRECTION

PATENT NO. : 4,828,726
DATED : May 9, 1989
INVENTOR(S) : Ronald E. Himes and Edward F. Vinson It is certified that error appears in the above-identified patent and that said Letters Patent is hereby corrected as shown below:

In column 2, line 15, following the phrase U.S. Pat. Nos., "4,336,071" should read --4,366,071--.

In column 8, line 54, after the word halide, the word --anion-- should be inserted.

Signed and Sealed this

Twelfth Day of March, 1991

Attest:

HARRY F. MANBECK, JR.

Attesting Officer

Commissioner of Patents and Trademarks